United States Patent [19]

Tabuchi

[11] Patent Number: 5,438,362
[45] Date of Patent: Aug. 1, 1995

[54] REMOTE CONTROL SYSTEM

[75] Inventor: Junichiro Tabuchi, Tondabayashi, Japan

[73] Assignee: Sanyo Electric Co., Ltd., Moriguchi, Japan

[21] Appl. No.: 85,958

[22] Filed: Jul. 6, 1993

[30] Foreign Application Priority Data

Jul. 6, 1992 [JP] Japan ............................... 4-178224
Apr. 12, 1993 [JP] Japan ............................... 5-084703

[51] Int. Cl.⁶ ..................... H04N 5/232; H04N 5/222
[52] U.S. Cl. ................................... 348/211; 348/333
[58] Field of Search ............... 358/210, 209, 185, 108, 358/125, 194.1, 93; H04N 5/232, 5/225, 5/30, 5/222; 348/207, 208, 211, 212, 213, 214, 373, 374, 375, 376, 333

[56] References Cited

U.S. PATENT DOCUMENTS

| D. 266,668 | 10/1990 | Watabe . | |
|---|---|---|---|
| 4,450,487 | 5/1984 | Koide | 358/210 |
| 4,837,817 | 6/1989 | Maemori . | |
| 4,974,088 | 11/1990 | Sasaki | 358/210 |
| 5,079,634 | 1/1992 | Hosono | 358/210 |

FOREIGN PATENT DOCUMENTS

| 57-166782 | 10/1982 | Japan . | |
|---|---|---|---|
| 0210786 | 9/1987 | Japan | H04N 5/232 |
| 1-227580 | 9/1989 | Japan . | |
| 0168625 | 7/1991 | Japan | 358/210 |
| 4020077 | 1/1992 | Japan | H04N 5/225 |
| 4042673 | 2/1992 | Japan | H04N 5/232 |

OTHER PUBLICATIONS

Patent Abstracts of Japan, vol. 8, No. 74 (E-236) 6 Apr. 1984 of JP-A-58 222 694 (Hitachi Seisakusho KK) 24 Dec. 1983.
Patent Abstracts of Japan, vol. 15, No. 423 (E-1127) 28 Oct. 1991 of JP-A-03 177 169 (Hitachi Ltd.) 1 Aug. 1991.

Primary Examiner—James J. Groody
Assistant Examiner—Michael H. Lee
Attorney, Agent, or Firm—Armstrong, Westerman, Hattori, McLeland & Naughton

[57] ABSTRACT

A remote control apparatus includes a television monitor capable of displaying an image according to a video signal sent from a camcorder through a video signal line. An operating portion of the remote control apparatus includes keys, and a microcomputer which generates a control signal according to a key input from the keys. The control signal is applied to an infrared ray emitting device when the apparatus is not connected to the camcorder such that the camcorder can be wireless-controlled. If the apparatus is connected to the camcorder through a control signal line and the video signal line, the control signal is applied to the camcorder through the control signal line, and a control signal for controlling a rotation table of the camcorder is applied to the infrared ray emitting device, and therefore, the camcorder can be wire-controlled and the rotation table can be wireless-controlled.

4 Claims, 7 Drawing Sheets

REMOTE CONTROL SYSTEM

BACKGROUND OF THE INVENTION

1. Field of the Invention

The present invention relates to a remote control system. More specifically, the present invention relates to a remote control apparatus having a television monitor capable of displaying an image according to a video signal sent from electronic equipment such as a video camera or a camcorder through a video signal line, and to an electronic equipment control system utilizing such a remote control apparatus.

2. Description of the Related Art

One example of a conventional remote control apparatus with a television monitor is disclosed in, for example, Japanese Patent Application Laying-open No. 57-166782 (H04N5/26) laid-open on Oct. 14, 1982. In this related art, a video camera and a remote control apparatus are connected to each other through a cable for transmitting a video signal from a camera circuit of the video camera to the remote control apparatus and a control signal from the remote control apparatus to the video camera. Then, an image according to the video signal is displayed on a view finder provided on the video camera.

Furthermore, another example of a remote control apparatus is disclosed in, for example, Japanese Patent Application Laying-open No. 1-227580 (H04N5/232) laid-open on Sep. 11, 1989. In this related art, the remote control apparatus has a function of a remote control by utilizing an infrared ray, and a video signal transmitted from a video camera by an electronic wave is received and displayed by an electronic view finder.

In the former remote control apparatus, it is impossible to wireless-control the video camera. Furthermore, in the latter remote control apparatus, a transmitter and a receiver for transmitting and receiving the video signal of the electronic wave are required, and therefore, a cost of the system becomes high.

SUMMARY OF THE INVENTION

Therefore, an object of the present invention is to provide a remote control apparatus with television monitor, which can solve the problem of the above described related art.

Another object of the present invention is to provide a remote control system capable of being used more easily.

Another object of the present invention is to provide a remote control system which is inexpensive.

In order to solve the above described problem, the present invention is a remote control apparatus with television monitor capable of monitoring a video signal sent from electronic equipment through a signal line in which the remote control apparatus comprises wire control means for controlling the electronic equipment through a control signal line; wireless control means for controlling the electronic equipment by means of an infrared ray or an electromagnetic radio frequency wave; connection detecting means for detecting connection of the remote control apparatus and the electronic equipment through the signal line and the control signal line; and function stopping means for stopping at least some of the functions of the wireless control means when the above described connection is detected by the connection detecting means.

In a case where the television monitor is connected to the electronic equipment such as a video camera or a camcorder by the signal line and the control signal line, the electronic equipment is remotely controlled by the wire control means, and it becomes possible to the video signal by the monitor television monitor. In contrast, when the electronic equipment is not connected to the monitor television, the electronic equipment can be remotely controlled by the infrared ray or electromagnetic radio frequency wave.

In accordance with the present invention, if the electronic equipment and the remote control apparatus are connected to each other through the signal line and control signal line, it becomes possible to remotely control the electronic equipment by means of the wire control means and to remotely monitor the video signal on the television monitor of the remote control apparatus and, if both are not connected to each other, it becomes possible to remotely control the electronic equipment by means of the wireless control means. In addition, even though both of the wire control means and the wireless control means which have the same purpose are utilized, no erroneous operation occurs. Therefore, it is possible to provide a remote control apparatus with monitor television which can be used more easily and is inexpensive.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
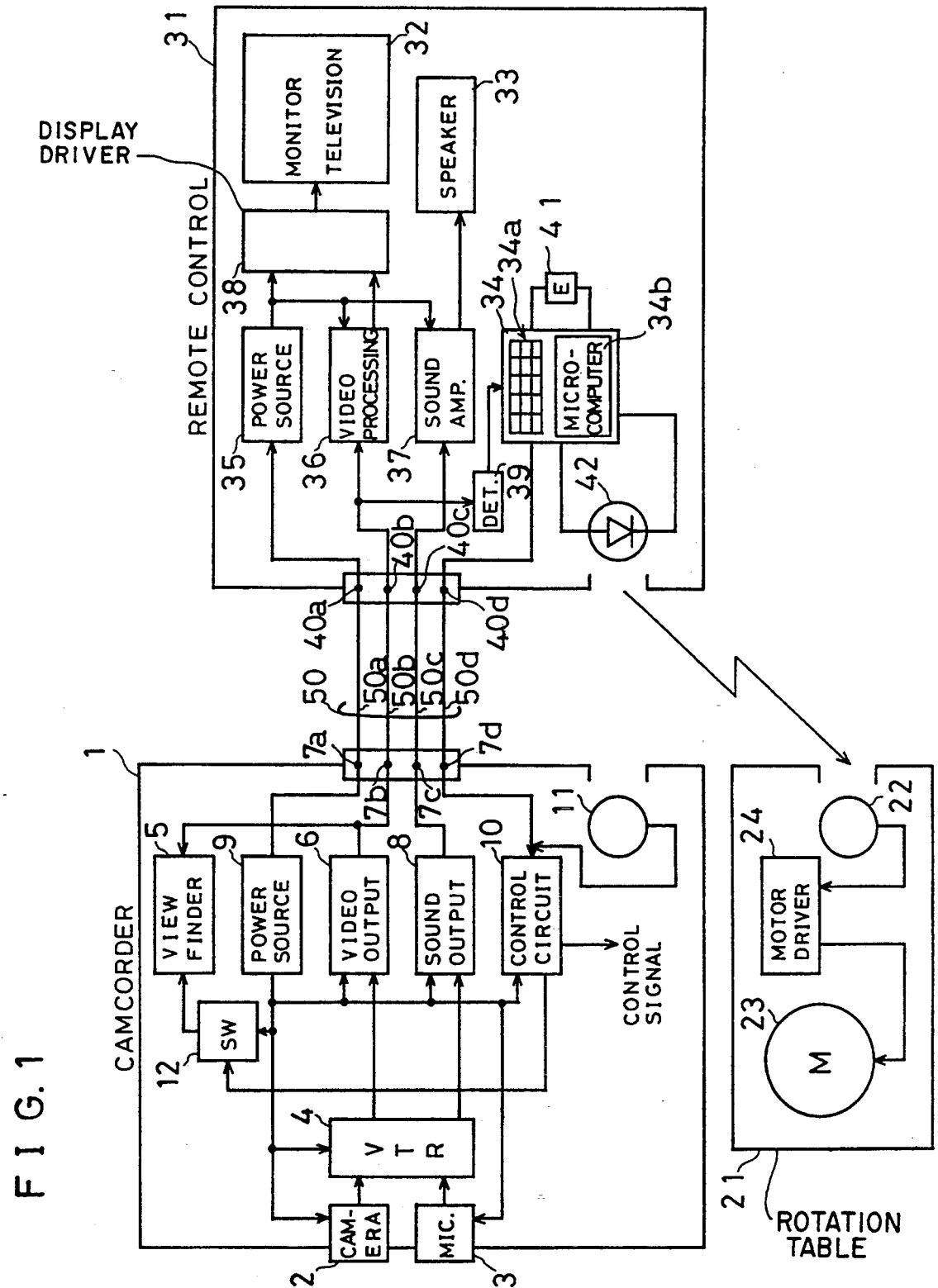
FIG. 1 is a functional block diagram showing a state of a first embodiment in accordance with the present invention.

FIG. 1 is a functional block diagram showing a state where a remote control apparatus with a television monitor according to a first embodiment of the present invention is connected to a camcorder that is an example of electronic equipment. In FIG. 1, the reference numeral 1 denotes a camcorder which includes a video camera 2 having an optical lens, an image sensing device and self contained signal processing circuit (not shown), a microphone 3, a VTR 4, and an electronic view finder 5.

A video signal from the video camera 2 and a sound signal from the microphone 3 are recorded on a video tape (not shown) by the VTR 4. A video signal from the VTR 4, that is, a video signal reproduced by the VTR 4 or a video signal directly supplied by the video camera 2 is amplified by a video output circuit 6, and then, not only displayed on the electronic view finder 5 but also supplied to a terminal 7b.

On the other hand, a sound signal from the VTR 4, that is, a sound signal reproduced by the VTR 4 or a sound signal directly supplied from the microphone 3 is amplified by a sound output circuit 8, and then, supplied to a terminal 7c.

In addition, the reference numeral 9 denotes an electric power source device which supplies an electric power to respective portions of the camcorder 1 and a terminal 7a. Furthermore, the reference numeral 10 denotes a control circuit which includes a microcomputer, for example, and receives a control signal supplied from a terminal 7d or an infrared ray control signal that is received by an infrared ray sensor 11, and controls respective portions of the camcorder 1, that is, a switch 12 and etc. in response to the control signal.

In addition, the reference numeral 21 denotes a rotation table which is provided at a bottom portion of the camcorder 1 as an accessory therefor so as to change a direction toward which the camcorder 1 is oriented. The rotation table 21 includes an infrared ray sensor 22 which receives an infrared ray control signal, a motor 23 for rotating the camcorder 1, and a motor driver 24 for driving the motor 23 in accordance with a control signal from the infrared ray sensor 22.

A remote control apparatus 31 includes a television monitor 32 which is constructed by a liquid-crystal panel, for example, a speaker 33 and an operating portion 34. The operating portion 34 includes keys 34a for entering a remote control command, and a microcomputer 34b which receives the remote control command and generates a control signal in accordance with the command. In addition, the reference numeral 35 denotes an electric power source circuit, the reference numeral 36 denotes a video processing circuit, the reference numeral 37 denotes a sound amplifier, the reference numeral 38 denotes a display driver for driving the television monitor 32, the reference numeral 39 denotes a detection circuit for detecting that the video signal is supplied from the camcorder 1 to a terminal 40b, the reference numeral 41 denotes a battery which supplies an electric power to the operating portion 34, and the reference numeral 42 denotes an infrared ray emitting device which converts the control signal generated by the microcomputer 34b of the operating portion 34 into an infrared ray control signal.

Figure 2:
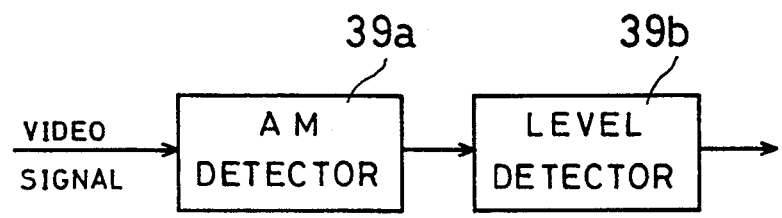
FIG. 2 is a block diagram showing a detecting circuit of FIG. 1 embodiment.

In addition, the above described detecting circuit 39 can be constructed as shown in FIG. 2. More specifically, the detecting circuit 39 includes an AM detector 39a for demodulating a video signal which is sent from the camcorder 1 through the terminal 7b, a video signal line 50b included in a cable 50, and a terminal 40b. A demodulated signal from the AM detector 39a is supplied to a level detector 39b in which it is determined whether a level of the demodulated signal exceeds a predetermined threshold level. Therefore, the level detector 39b outputs a detection signal representing that the video signal is supplied from the camcorder 1, that is, that the camcorder 1 and the remote control apparatus 31 are connected to each other when the level of the demodulated signal exceeds the threshold level.

Next, an operation of the first embodiment in a case where the remote control apparatus 31 and the camcorder 1 are connected to each other by the cable 50 will be described. As shown in FIG. 1, the cable 50 includes a power source line 50a, the above described video signal line 50b, and a sound signal line 50c which respectively supplies an electric power, a video signal, a sound signal to the remote control apparatus 31 from the camcorder 1, and further includes a control signal line 50d which supplies a control signal to the camcorder 1 from the remote control apparatus 31. More specifically, the electric power line 50a connects the electric power source device 9 of the camcorder 1 and the electric power source circuit 35 of the remote control apparatus 31. The electric power source circuit 35 supplies an electric power that is supplied by the electric power source device 9 to respective portions of the remote control apparatus 31 except for the operating portion 34 while the electric power is converted into values required for the respective portions.

Furthermore, as described above, the video signal from the video output circuit 6 is inputted to the video processing circuit 36 and the detecting circuit 39 of the remote control apparatus 31 through the video signal line 50b. A video signal outputted from the video processing circuit 36 is converted into a display signal for driving the television monitor 32 by the display driver. Then, the video signal is displayed as an image on the television monitor 32. Furthermore, the sound signal from the sound output circuit 8 is inputted to the sound amplifier 37 of the remote control apparatus 31 through the sound signal line 50c and amplified therein to be monitored by the speaker 33. Therefore, it is possible to monitor an image and a sound directly outputted from the video camera 2 and the microphone 3 of the camcorder 1, or a video signal and a sound signal which are reproduced by the VTR 4, at a place separated from the camcorder 1.

On the other hand, the control signal from the operating portion 34 of the remote control apparatus 31 is inputted to the control circuit 10 of the camcorder 1 through the control signal line 50d, and therefore, respective portions of the camcorder 1 can be controlled by the control circuit 10.

Furthermore, if it is detected that the video signal is supplied from the camcorder 1 to the remote control apparatus 31, that is, that the camcorder 1 and the remote control apparatus 31 are connected to each other by the video signal line 50b and the control signal line 50d by the detecting circuit 39, a function for controlling the camcorder 1 out of functions of a wireless control means by the infrared ray emitting device 42 which is provided in association with the operating portion 34 is stopped, and therefore, no infrared ray is emitted by the infrared ray emitting device 42. This is to prevent erroneous operation of the control circuit 10 of the camcorder 1 due to the interference of the control signal from the infrared ray emitting device 42 and the control signal from the control signal line 50d.

In addition, even if the detection is made by the detecting circuit 39, a function for controlling the rotation table 21 is not stopped.

Figure 3:
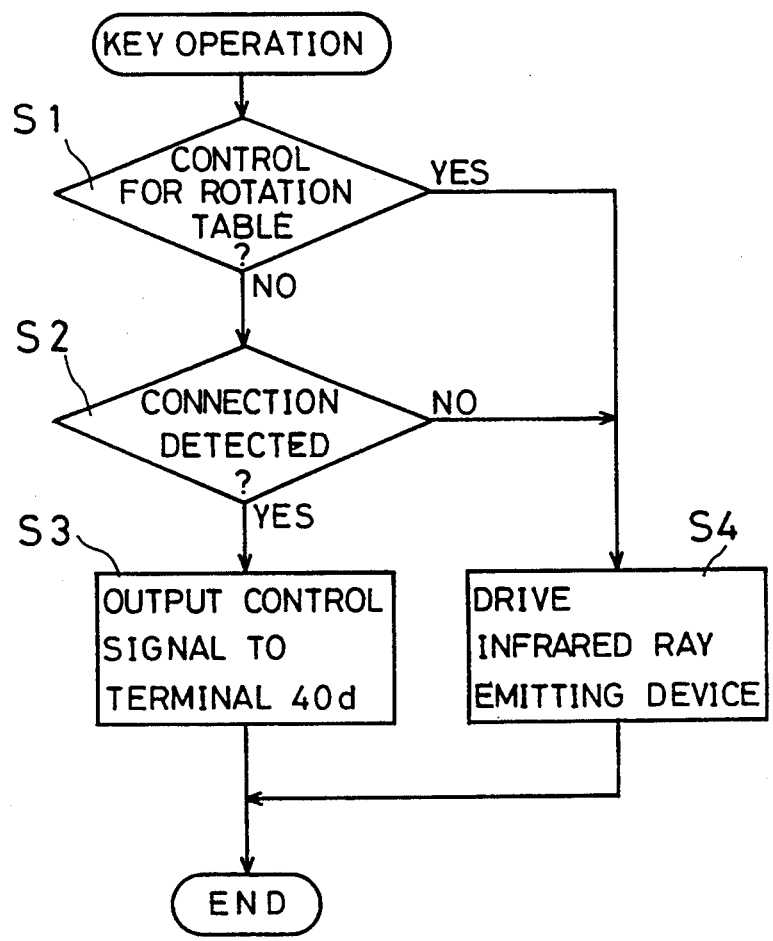
FIG. 3 is a flow chart showing an operation of an operating portion of the first embodiment.

More specifically, as shown in FIG. 3, at a first step S1, the microcomputer 34b determines whether a remote control command inputted by the keys 34a is for controlling the camcorder 1 or for controlling the rotation table 21. If it is determined that the remote control command being inputted at that time is for controlling the camcorder 1 in the step S1, the microcomputer 34b determines in accordance with the output signal from the above described detecting circuit 39 whether or not the connection of the camcorder 1 and the remote control apparatus 31 via the cable 50 is detected, in a step S2. If "NO" is determined in the step S1 and "YES" is determined in the step S2, in a next step S3, the microcomputer 34b outputs a control signal according to the remote control command inputted by the keys 34a to the terminal 40d. Therefore, the control signal from the microcomputer 34b, that is, the operating portion 34 is sent to the control circuit 10 through the control signal line 50d and the terminal 7d. In other words, a wire-control means is made effective.

On the other hand, if it is determined that the remote control command inputted by the keys 34a is for controlling the rotation table 21 in the step S1, in a step S4, the infrared ray emitting device 42 is driven by the control signal generated by the microcomputer 34b, that is, the operating portion 34 even if the connection is detected or is not detected by the detecting circuit 39. Therefore, the infrared ray control signal for controlling the rotation table 21 is emitted by the device 42 and received by the infrared ray sensor 22 provided on the rotation table 21, so that the motor 23, that is, the rotation angle of the rotation table 23 can be controlled by the infrared control signal.

Furthermore, if the connection is not detected by the detecting circuit 39 in the step S2, that is, the camcorder 1 and the remote control apparatus 31 are not connected to each other through the cable 50, in the above described step S4, the infrared ray emitting device 42 is driven by the control signal from the microcomputer 34b. Therefore, the infrared ray control signal is emitted by the device 42 and received by the infrared sensor 11, so that respective portions of the camcorder 1 can be controlled by the infrared ray control signal.

Thus, a wireless control means is made effective when the camcorder 1 and the remote control apparatus 31 are not connected to each other by the cable 50. However, if the both are connected to each other by the cable 50, a function of the wireless control means for controlling the camcorder 1 is stopped while a function of the wireless control means for controlling the rotation table 21 is not stopped. In other words, when the camcorder 1 and the remote control apparatus 31 are connected to each other through the cable 50, some of the functions of the wireless control means are inhibited.

Furthermore, if the control signal is supplied through the control signal line 50d is detected by the control circuit 10, it is determined that the video signal is monitored by the television monitor 32 of the remote control apparatus 31 is performed, and therefore, the control circuit 10 controls the switch 12 such that an electric power supply to the electronic view finder 5 is interrupted. Therefore, unnecessary image display by the electronic view finder 5 is not performed.

Figure 4:
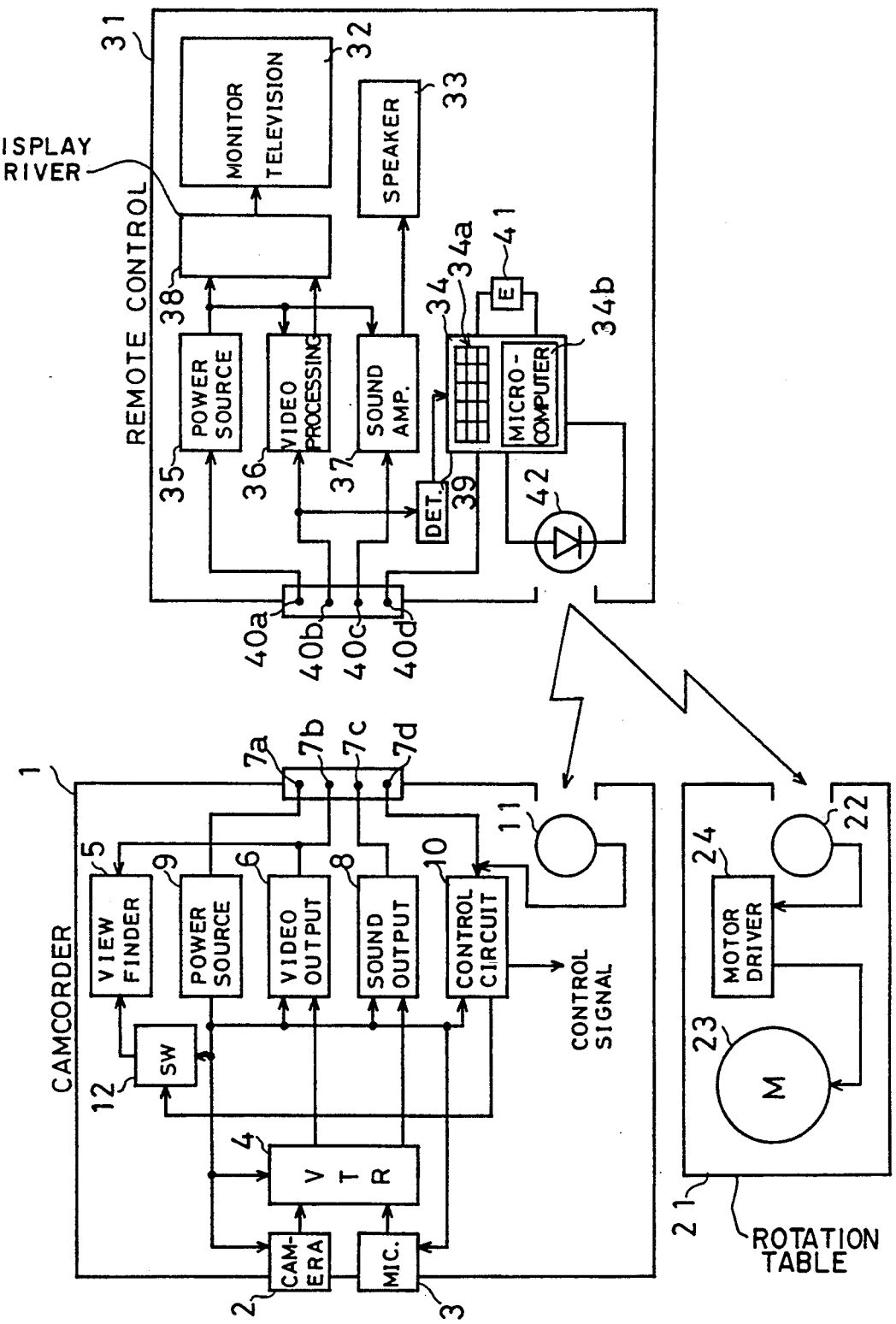
FIG. 4 is a functional block diagram showing another state of the first embodiment.

In the following, an operation of the first embodiment in a case where the camcorder 1 and the remote control apparatus 31 are not connected to each other by the cable 50 will be described with referring to a functional block diagram of FIG. 4. As seen from FIG. 4, because the cable 50 does not exist, no electric power, no video signal, and no sound signal are supplied from the camcorder 1 to the remote control apparatus 31, and therefore, each of the video processing circuit 36, the sound amplifier 37 and the display driver 38 does not operate, and accordingly, monitoring of the video signal by utilizing the television monitor 32 and the monitor of the sound signal by utilizing the speaker 33 cannot be made. However, an electric power is supplied to the operating portion 34 by the battery 41. In this case, the detection circuit 39 does not detect the connection of the camcorder 1 and the remote control apparatus 31, and therefore, all the functions of the wireless control means by utilizing the infrared ray emitting device 42 can be performed. Therefore, both of the camcorder 1 and the rotation table 21 become able to be controlled by the wireless control means.

In addition, the same signal format is adapted by both the wire control means and the wireless control means in the control circuit 10. More specifically, the control signal which is supplied from the operating portion 34 of the remote control apparatus 31 through the control signal line 50d and the control signal which is supplied through the infrared ray emitting device 42 have the same signal format as shown in FIG. 5, and therefore, it is intended to simplify the circuit structure.

Figure 5A:
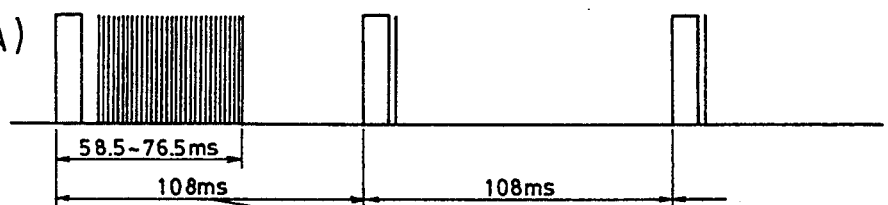
FIG. 5 is an illustrative view showing data format of a control signal used by a wire-control and a wireless-control in the first embodiment.

More specifically, both the wire control signal and the wireless control signal have the signal format shown in FIG. 5(A). The signal includes a leader code of 13.5 milliseconds, for example, a custom code of 8 bits, an inverted custom code of 8 bits, a data code of 8 bits, and an inverted data code of 8 bits. The leader code is for notifying that the leader code is followed by the control signal including the custom code and the data code to the control circuit 10 of the camcorder 1. The custom code is utilized for identifying manufacturers and kinds of the electronic equipment to be controlled. That is, it is possible to identify that the equipment to be controlled is a camcorder of Sanyo Electric Co., Ltd., for example. The data code is used for identify an operation of the electric equipment to be controlled. By the data code, it is possible to command the content of the operation of the camcorder 1, for example, "Play", "Stop", "Record", "Feed Forward", "Rewinding", and etc.

Figure 5B:
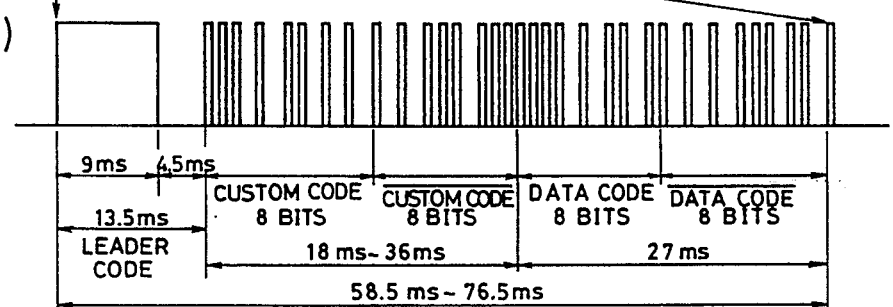
Figure 5C:
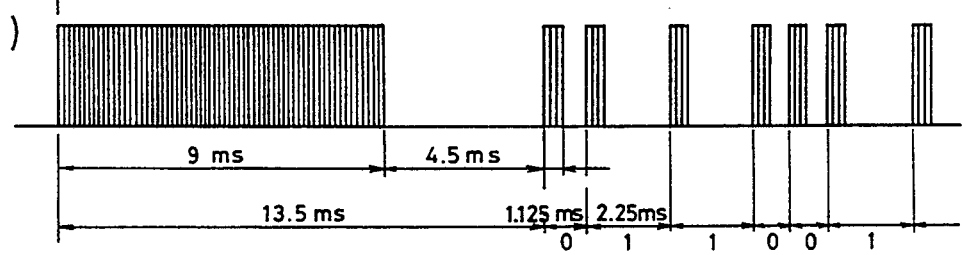
Figure 5D:
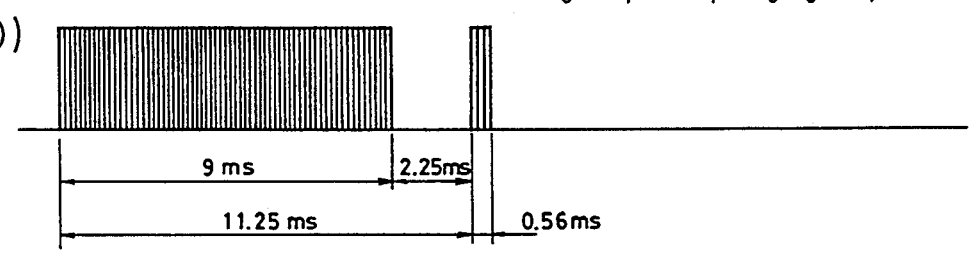

At time first time, the control signal as shown in FIG. 5(B) or FIG. 5(C) is sent to the control circuit 10; however, if one of the keys 34a is continued to be depressed, at the second time and thereafter, the control signal as shown in FIG. 5(D) for indicating that the control signal of the first time is to be repeated is sent to the control circuit 10.

Figure 5E:
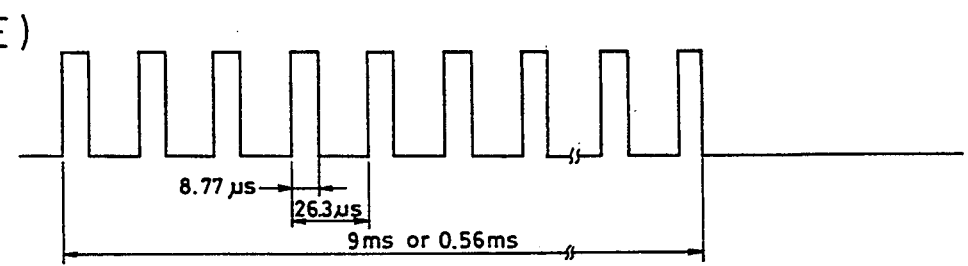

In addition, if an infrared ray is utilized as the wireless control means, a carrier signal shown in FIG. 5(E) is included in the infrared ray control signal such that an influence due to a disturbance light can be eliminated; however, if the control signal is sent via the control signal line 50d, no carrier signal is utilized.

Next, a remote control system which is a second embodiment of the present invention will be described with reference to functional block diagrams shown in FIG. 6 to FIG. 8. In the second embodiment, descriptions similar to or the same as that of the portions of the first embodiment will be omitted here.

Figure 6:
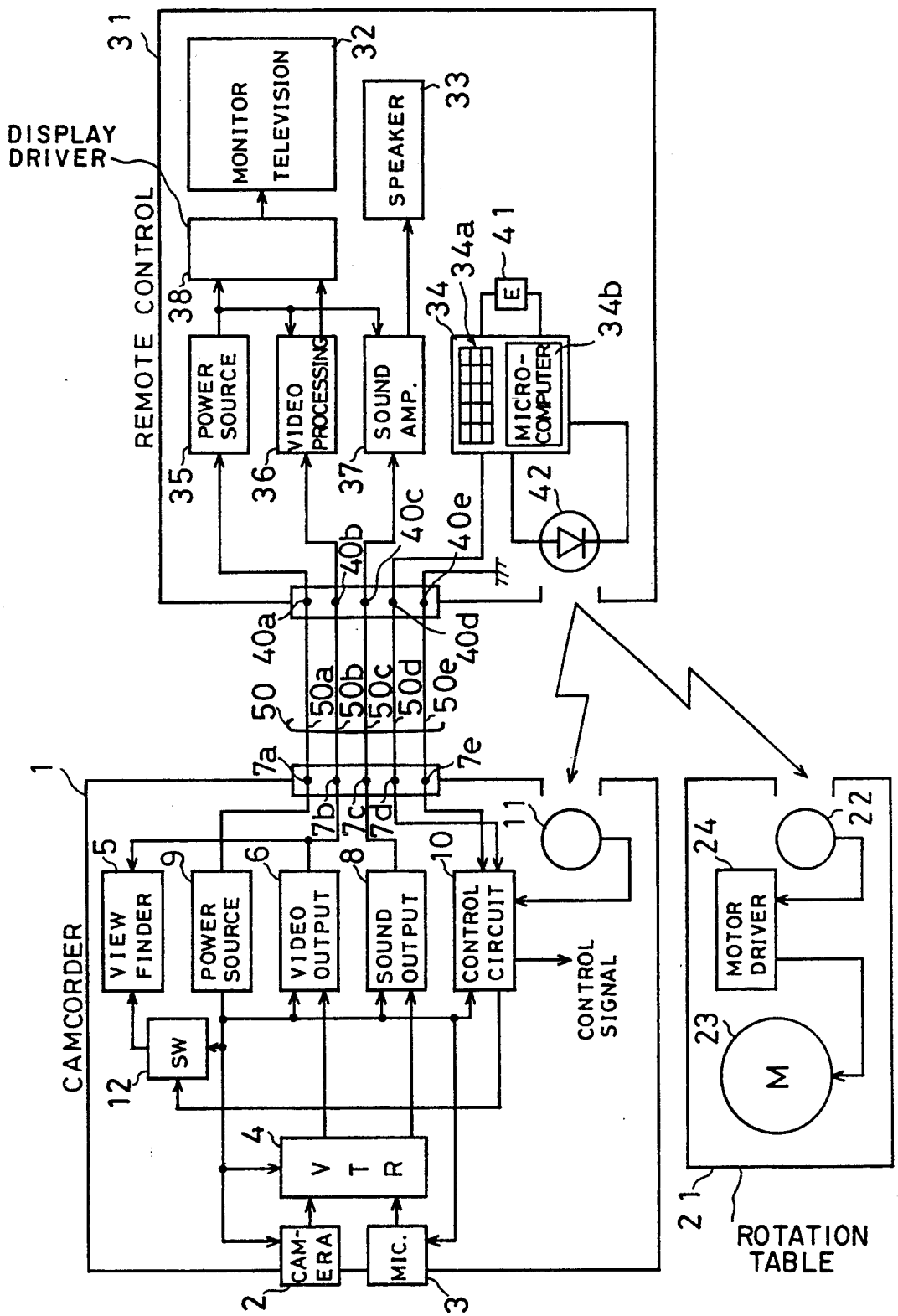
FIG. 6 is a functional block diagram showing a state of a second embodiment in accordance with the present invention.

The embodiment of FIG. 6 is different from the embodiment of FIG. 1 in that the detection circuit 39 for detecting that the video signal is supplied to the terminal 40b of the remote control apparatus 31 is not provided, that a connection detecting line 50e is provided in the cable 50, the terminal 7e of the camcorder 1 to which the connection detecting line 50e is connected is connected to the control circuit 10, and that the terminal 40e of the remote control apparatus 31 is connected to the ground.

More specifically, as shown in FIG. 6, when the camcorder 1 and the remote control apparatus 31 are connected to each other by the cable 50, the terminal 7e is connected to the ground through the connection detecting line 50e and the terminal 40e. The control circuit 10 determines that the camcorder 1 and the remote control apparatus 31 are connected to each other through the video signal line 50b and the control signal line 50d when the terminal 7e is not connected to the ground, and then, the control circuit 10 does not receive an input of the control signal from the infrared ray sensor 11. Therefore, the control circuit 10 operates in accordance with the control signal that is inputted through the control signal line 50d, and therefore, no erroneous operation due to the interference of the wireless control signal from the infrared ray emitting device 42 and the wire control signal from the control signal line 50d occurs in the control circuit 10.

Figure 7:
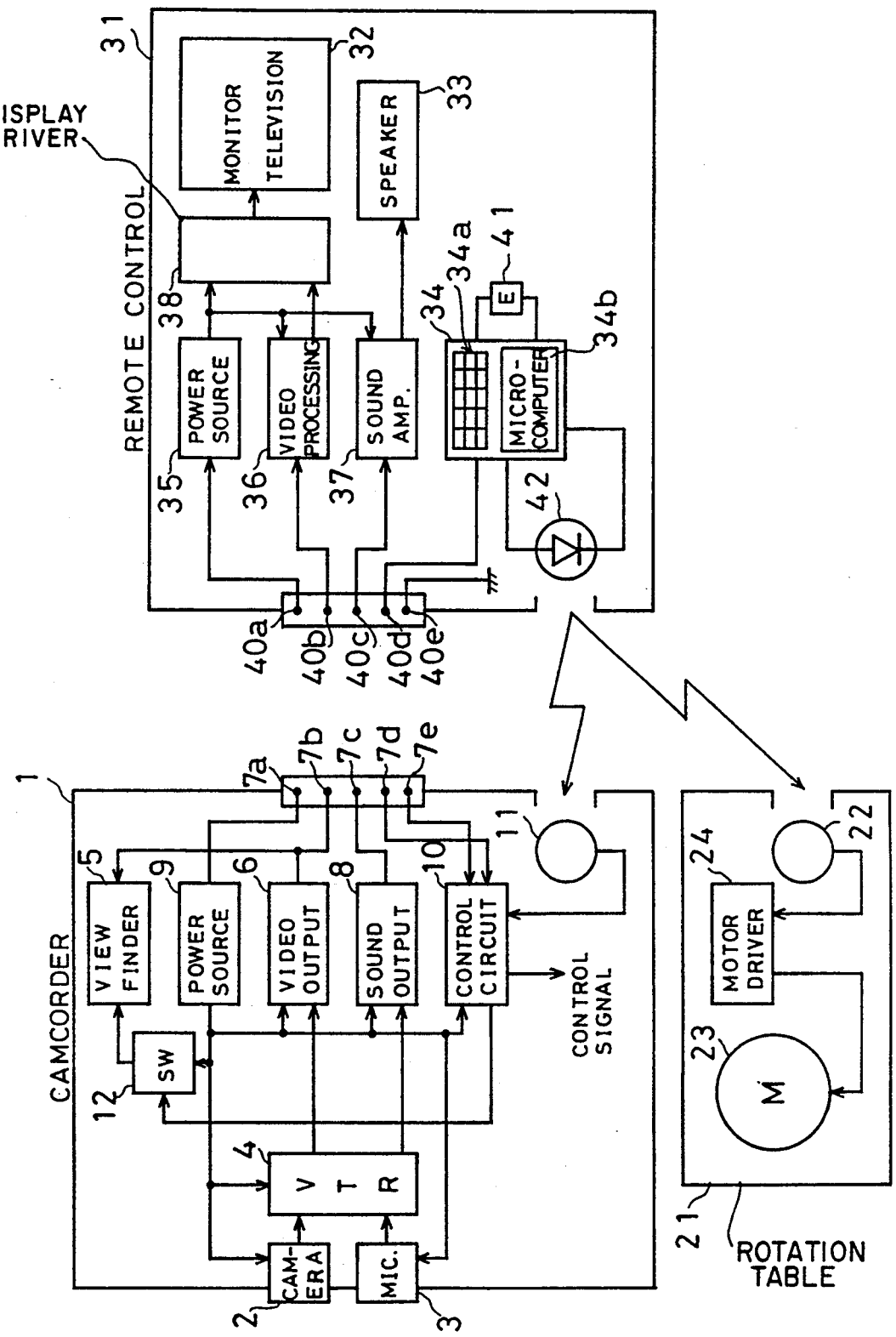
FIG. 7 is a functional block diagram showing another state of the second embodiment.

On the other hand, as shown in FIG. 7, when the camcorder 1 and the remote control apparatus 31 are not connected to each other by the cable 50, no control signal from the control signal line 50d is inputted to the control circuit 10. However, the terminal 7e is not connected to the ground, and therefore, the control circuit 10 receives an input of the control signal from the infrared ray sensor 11. Therefore, it becomes possible to remote-control the camcorder 1 by utilizing the infrared ray.

Figure 8:
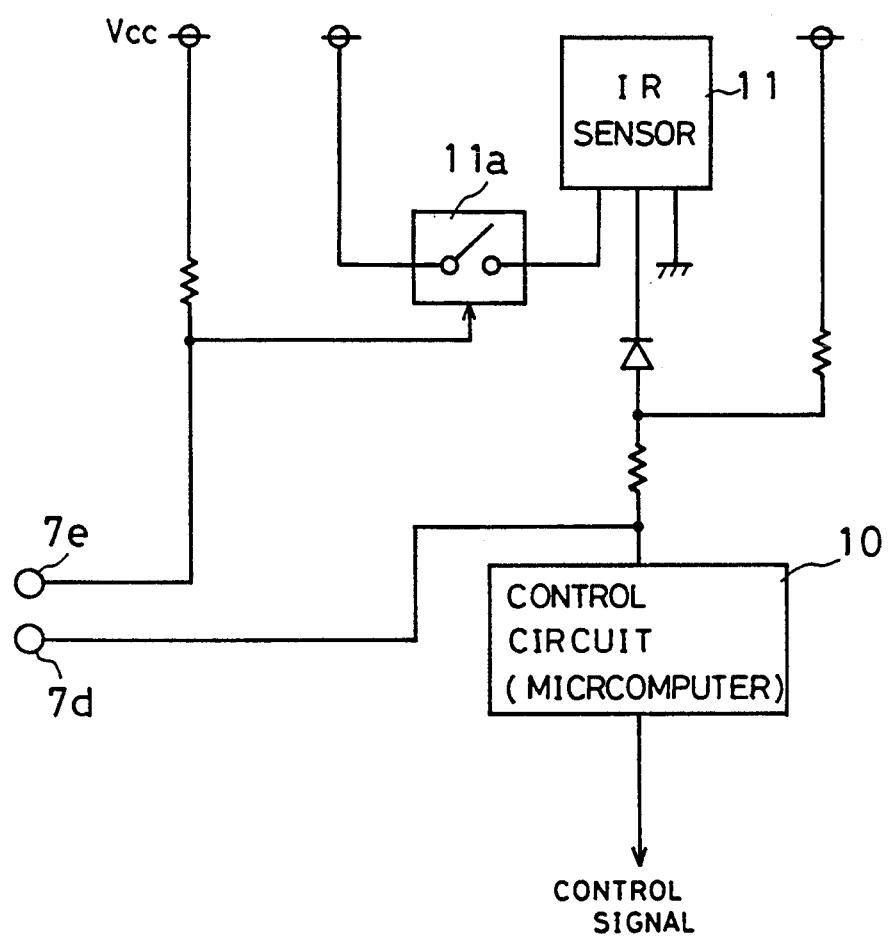
FIG. 8 is a block diagram showing a control circuit and associated portions of the second embodiment.

More specifically, as shown in FIG. 8, between an electric power source Vcc and the infrared sensor, a switch 11a is inserted, and the switch 11a is turned-on or off by the signal level at the terminal 7e. If the camcorder 1 and the remote control signal are connected to each other by the cable 50 as shown in FIG. 6, the terminal 7e is connected to the ground through the connection detecting line 50e and the terminal 40e, and therefore, the switch 11a is turned-off because the level at the terminal 7e becomes a low level. Accordingly, the infrared ray sensor 11 is disabled, and no wireless control signal from the infrared ray sensor 11 is inputted to the control circuit 10. In contrast, as shown in FIG. 7, both are not connected to each other by the cable 50, the level at the terminal 7e becomes a high level, and therefore, the infrared ray sensor 11 is enabled, and thus, the wireless control signal is inputted to the control circuit 10 while no wire control signal is inputted to the control circuit 10 because no control signal is applied through the control signal line 50d to be terminal 7d.

The embodiments according to the present invention were described in the above; however, it is needless to say that as the wireless control means, an electromagnetic radio frequency wave may be utilized instead of the infrared ray.

Infrared ray emitting device 42 and infrared ray sensor 22, shown in FIG. 1, may be replaced with an electromagnetic radio frequency wave transmitter and receiver, respectively.

In addition, a piece of electronic equipment to be controlled by the remote control apparatus may be an arbitrary equipment including portions to be remote-controlled and a video signal generating means such as a video camera, a television set, a video recording reproducing apparatus, and etc.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A remote control apparatus, having a television monitor capable of displaying an image according to a first video signal sent from a first piece of electronic equipment through a video signal line, said first piece of electronic equipment including video signal generating means for generating said first video signal and first operation control means for controlling an operation of said first piece of electronic equipment in response to a control signal, said remote control apparatus comprising:

wire control means for applying a first control signal to said operation control means of said first electronic equipment by means utilizing an electronic signal through a control signal line;

wireless control means for applying a second control signal to said operation control means of said first electronic equipment by means utilizing one of an infrared ray and an electromagnetic radio frequency wave;

connection detecting means for detecting connection of said remote control apparatus and said first piece of electronic equipment through said video signal line and said control signal line; and function stopping means for inhibiting at least one of the functions of said wireless control means when said connection is detected by said connection detecting means, wherein said wireless control means applies a third control signal to a second piece of electronic equipment which includes second operation control means for controlling an operation of said second piece of electronic equipment in response to said third control signal; wherein said function stopping means does not inhibit a function of said third control signal of said wireless control means.

2. A remote control apparatus according to claim 1, wherein said first piece electronic equipment includes a video camera for generating a first video signal, and video camera being controlled by said first operation control means in response to one of said first control signal and said second control signal, and said second electronic equipment includes an attachment for acting on said video camera, said attachment being controlled by said second control means in response to said third control signal.

3. A remote control apparatus according to claim 2, wherein said first piece electronic equipment further includes a video recording/reproducing unit for recording said first video signal on a recording medium and for reproducing said recording medium to generate a second video signal, one of said first video signal and said second video signal being sent to said remote control apparatus through said video signal line.

4. An electronic equipment control system comprising:

a television monitor capable of monitoring a video signal sent from a first piece of electronic equipment through a signal line;

wire control means for controlling said first piece of electronic equipment by means of a first control signal utilizing an electronic signal through a control signal line;

wireless control means for controlling said first piece of electronic equipment by means of a second control signal utilizing an infrared ray or an electromagnetic radio frequency wave;

connection detecting means for detecting connection of said television monitor and said first piece of electronic equipment through said signal line and said control signal line; and function stopping means for inhibiting at least one of the functions of said wireless control means when said connection is detected by said connection detecting means, wherein said wireless control means applies a third control signal for controlling a second piece of electronic equipment, wherein said function stopping means does not inhibit a function of said third control signal of said wireless control means.

* * * * *